(12) United States Patent
Renault

(10) Patent No.: US 6,435,577 B1
(45) Date of Patent: Aug. 20, 2002

(54) COMBINATION BUMPER SKIN AND UNDER-ENGINE FAIRING FOR A VEHICLE

(75) Inventor: Thierry Renault, Vernon (FR)

(73) Assignee: Peguform France (FR)

( * ) Notice: Subject to any disclaimer, the term of this patent is extended or adjusted under 35 U.S.C. 154(b) by 0 days.

(21) Appl. No.: 09/701,474

(22) PCT Filed: Mar. 27, 2000

(86) PCT No.: PCT/FR00/00761

§ 371 (c)(1),
(2), (4) Date: Nov. 29, 2000

(87) PCT Pub. No.: WO00/58144

PCT Pub. Date: Oct. 5, 2000

(30) Foreign Application Priority Data

Mar. 29, 1999 (FR) ............................................. 99 03874

(51) Int. Cl.[7] .............................................. B60R 19/03

(52) U.S. Cl. ...................... 293/120; 293/107; 293/109; 293/121; 293/146; 296/38; 296/189; 296/204; 180/69.1

(58) Field of Search ........................ 180/69.1; 293/107, 293/109, 120, 121, 146; 296/38, 189, 204

(56) References Cited

U.S. PATENT DOCUMENTS

| | | | | | |
|---|---|---|---|---|---|
| 2,899,019 | A | * | 8/1959 | Colgan | 184/106 |
| 3,836,188 | A | * | 9/1974 | Klees | 293/120 |
| 4,084,655 | A | * | 4/1978 | Savron | 180/69.1 |
| 4,098,520 | A | * | 7/1978 | Ezaki et al. | 280/784 |
| 6,099,039 | A | * | 8/2000 | Hine | 280/781 |
| 6,117,520 | A | * | 9/2000 | Wielinga et al. | 428/116 |
| 6,202,778 | B1 | * | 3/2001 | Mistry et al. | 180/69.1 |
| 6,220,655 | B1 | * | 4/2001 | Gure et al. | 296/203.02 |

FOREIGN PATENT DOCUMENTS

| | | |
|---|---|---|
| DE | 33 22 061 A1 | 12/1984 |
| EP | 0 649 736 B1 | 7/1998 |
| FR | 2 445 783 | 8/1980 |
| FR | 2 548 995 A1 | 1/1995 |
| FR | 2 757 124 A1 | 6/1998 |

* cited by examiner

*Primary Examiner*—Stephen T. Gordon
*Assistant Examiner*—Lori L Coletta
(74) *Attorney, Agent, or Firm*—Brooks & Kushman P.C.

(57) ABSTRACT

The inventive combination comprises a front bumper skin (34) pertaining to a motor vehicle and an inner closing part (12) pertaining to an engine compartment, mounted to the rear of said skin in relation to the principal direction in which the vehicle travels. The closing part (12) comprises a front transversal profiled section (18).

17 Claims, 2 Drawing Sheets

COMBINATION BUMPER SKIN AND UNDER-ENGINE FAIRING FOR A VEHICLE

The invention relates to plates for closing the bottom of the engine compartment of a vehicle, often referred to as "under-engine fairings".

It is known that pedestrians constitute 3% to 10% of road accident deaths. Most of these victims are killed in built-up areas while crossing the street or while playing in it. A first regulatory test procedure was created in 1996 seeking to represent a front impact between a vehicle traveling at 40 kilometers per hour (km/h) and a pedestrian crossing the road. Three kinds of impact are defined:

impact of the head against the hood or bonnet;

thigh impact; and leg impact.

Manufacturers will thus progressively integrate constraints concerning the development of the vehicles they make.

Leg impact relates directly to bumpers. Three criteria are measured to ensure that the tibia is not broken and that the knee is not damaged:

deceleration against the tibia must be less than 150 g, where a represents the acceleration due to gravity;

shear must be less than 6 mm; and flexing of the knee less than 15°.

These values might be modified slightly in a forthcoming new regulation, but they will remain of the same order. When subjected to the test, a bumper is impacted in three different zones along its length. At present, no car on the market satisfies these new criteria, even though by chance some bumper zones do already give good results.

Furthermore, pedestrian impact criteria are in conflict with criteria for other standard impacts defined for bumpers:

parking impact 4 km/h; and reparability impact (or Danner) at 15 km/h.

The second criterion in particular requires the bumper to be very stiff whereas-pedestrian impact requires a bumper that is soft.

An object of the invention is to propose a solution that is simple and of low cost to enable vehicles to satisfy criteria associated with pedestrian impact and also with other conventional impacts.

To achieve this object, the invention provides a combination of a vehicle front bumper skin and a bottom closure piece for the engine compartment and mounted behind the skin relative to the main travel direction of the vehicle, and in which the closure piece includes a front transverse section member.

Thus, the section member creates a low point of contact making it possible in the event of a pedestrian impact to initiate rotation of the leg so that the vehicle can more easily satisfy the above-mentioned criteria (deceleration, shear, flexing). Furthermore, an important advantage of this solution is that it does not load the side rails of the vehicle. If a low bearing point is established for pedestrian impact purposes by using a conventional bumper beam connected to the side rails, then, in the event of a frontal impact at 56 km/h or 64 km/h, there would be a risk of the side rail twisting before absorbing the energy of the impact, which would endanger the lives of passengers in the vehicle. The invention thus makes it possible for pedestrian impact purposes to create a low bearing point that does not load the side rails, the closure plate being conventionally fixed to the engine sub-frame.

Advantageously, the combination includes a shock absorber extending behind the skin and in front of the section member.

Advantageously, the absorber comprises a cellular material.

Advantageously, the absorber is a bottom absorber, and the combination further includes a top beam and a top shock absorber mounted behind the skin and in front of the beam, the bottom absorber being stiffer than the top absorber against a frontal impact from the front of the vehicle.

Thus, for reasons of car styling, the top absorber and its associated portion of the skin can project generally further forward from the vehicle than the bottom absorber and its associated portion of the skin. Nevertheless, in the event of a pedestrian impact, the top absorber tends to deform more than the bottom absorber, so even if first contact with the leg takes place at the top of the bumper, genuine thrust against the leg is often rapidly transferred to the bottom of the bumper. This reconciles constraints of styling with constraints of pedestrian safety.

Advantageously, the section member extends entirely in register with the skin.

This dispenses with the bottom absorber.

Advantageously, the closure piece includes two side rails extending in the travel direction of the vehicle.

This increases the stiffness of the closure piece.

Advantageously, the section member and the side rails form a U-shape when seen from above.

Advantageously, the skin is arranged in such a manner that, in profile, a portion of the skin extends in front of the section member so as to be further forward than the portion (s) of the skin which are contiguous with said portion.

The invention also provides vehicle bodywork including a combination of the invention.

The invention also provides a bottom closure piece for a vehicle engine compartment, the piece comprising a plate and presenting a general plane of symmetry, and including a section member extending transversely to the plane of symmetry.

Other characteristics and advantages of the invention appear further from the following description of a preferred embodiment given by way of non-limiting example. In the accompanying drawings.

Figure 1:
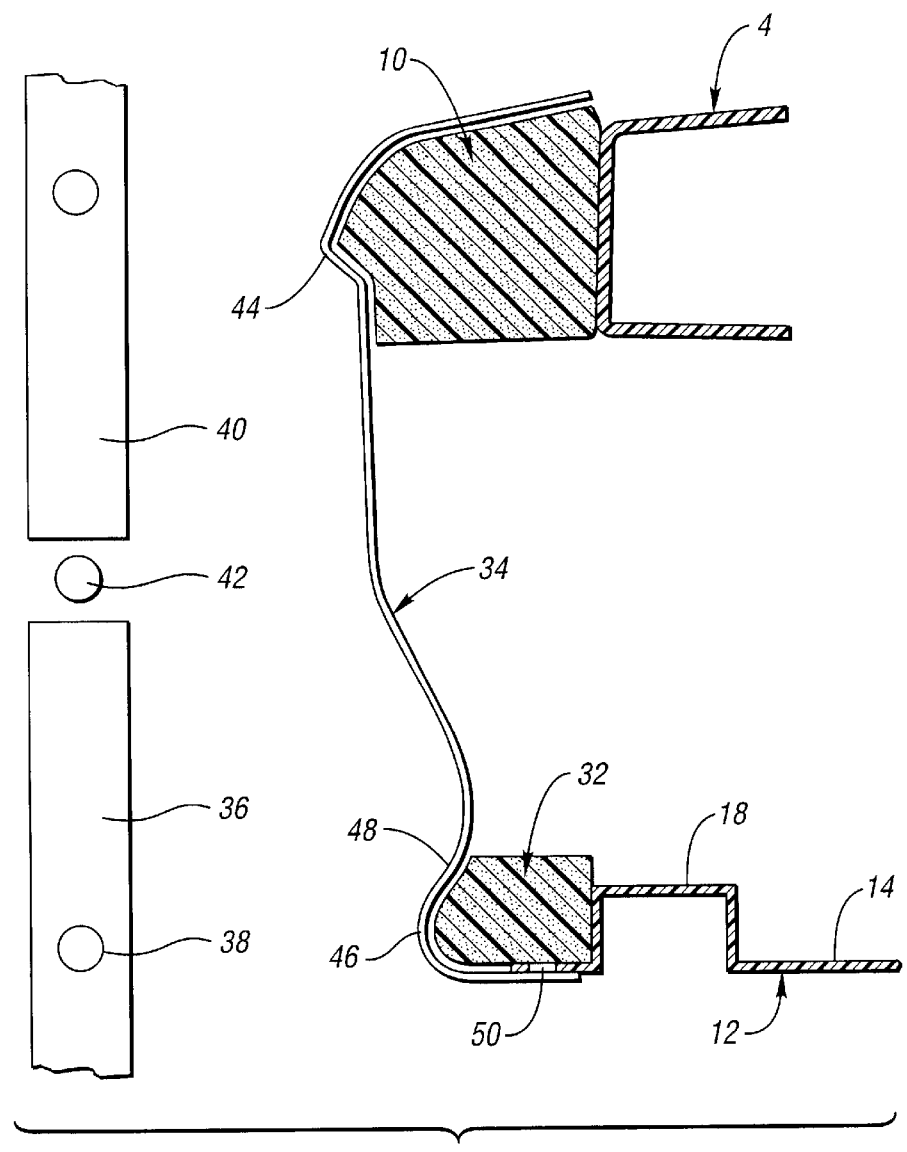
FIG. 1 is a cross-section view through a combination of the invention on the vertical longitudinal midplane of the vehicle, the figure also showing, diagrammatically, the leg of a pedestrian.
Figure 3:
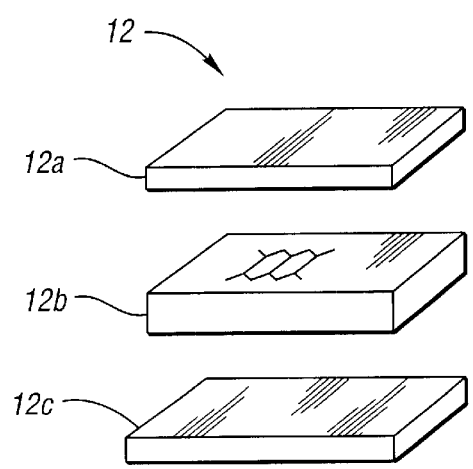
FIG. 3 is a view of the SANDWIFORM of the fairing.
Figure 2:
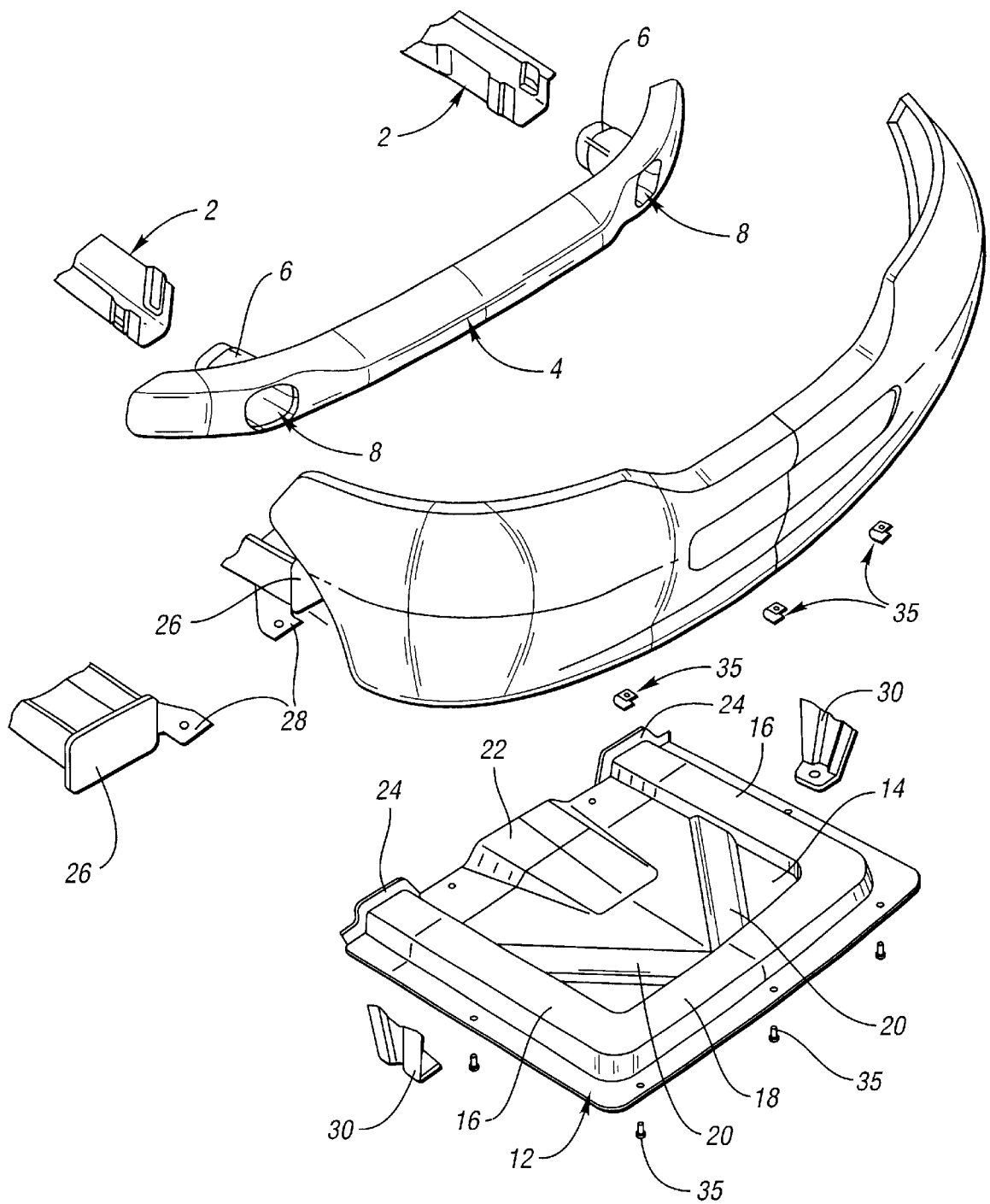
FIG. 2 is an exploded perspective view of bodywork including the combination of FIG. 1, the shock absorbers being omitted.

With reference to the figures, there is shown a portion of vehicle bodywork and structure including the combination of the invention. The structure has two side rails 2 of conventional type extending in the travel direction of the vehicle, and made of metal, for example.

The bodywork includes a curved bumper beam 4 extending transversely to the travel direction facing the front ends of the side rails 2, and extending from one side rail to the other. The beam 4 is constituted in this case by thermoplastic material reinforced with glass fibers. It is made by molding. Alternatively, the beam could be made of metal (e.g. steel or aluminum) or out of a sheet molding compound (SMC) type thermosetting plastics material. The beam is a channel section member being open towards the rear of the vehicle relative to the main travel direction of the vehicle. It has two generally cylindrical projections 6 extending rearwards in register with two openings 8 in the front face of the beam. The projections 6 are integral with the beam. They are adapted to be received in the open front ends of the side rails 2 to enable the beam to be fixed thereto.

The bodywork includes a top shock absorber 10 of curved shape, made of a deformable cellular material such as a foam. The absorber 10 is mounted in front of the beam 4, parallel thereto, and bearing against its front face. This type of absorber is known per se.

The bodywork has a bottom closure piece 12 for the engine compartment, referred to as "under-engine fairing".

The fairing comprises a plate 14 of generally rectangular shape that is not exactly plane, and two side rails 16 in the form of section members extending along the travel direction of the vehicle close to the respective side edges of the plate. The fairing 12 also includes a front transverse section member 18 in the form of a beam extending close to the front edge of the plate 14. In plan view, the section member 18 and the side rails 16 together form a rearwardly-open U-shape. The two side rails 16 and the section member 18 are continuous with one another in this case. They are formed integrally with the plate 14. The fairing 12 in this case is made by molding a thermoplastic material. The side rails 16 and the section member 18 project from a top face of the plate 14. Each of them constitutes a channel section member that is downwardly open beside the bottom face of the plate, as shown in FIG. 1 for the beam.

The fairing also has two rectilinear members 20 of trapezoidal section extending obliquely from the middle of the front section member 18 to the middles of the side rails 16. The plate has a ramp 22 at its rear edge to support the plate 14. The fairing has as its plane of symmetry the vertical longitudinal midplane of the vehicle.

The rear ends of the side rails 16 present respective plane abutments 24 in the form of walls closing the ends of the side rails. These abutments, extending perpendicularly to the travel direction of the vehicle, bear against analogous abutments 26 on the engine sub-frame of the vehicle. In this case, the fairing is fixed via its rear edge to two horizontal tabs 28 integral with the sub-frame, via its side edges to two top tabs 30 internal with parts of the bodywork and known per se, other than the side rails 2 and not directly fixed thereto, and via its front edge to the bumper skin as described below. This is merely an example of how the fairing can be fixed to the vehicle, and it is clear that other fixings could be envisaged. The fairing is preferably not connected to the side rails 2 so that impact against the fairing does not cause the side rails to bend.

The bodywork has a bottom shock absorber 32 of curved shape made of a deformable cellular material such as a foam. This absorber is mounted in front of the transverse section member 18 of the fairing 12, bearing against it, and on the front edge of the plate. In this case it is stuck to them. Alternatively, it could be heat sealed or clipped to the section member 18.

The transverse section member 18 extends substantially vertically below the bumper beam 4. Similarly, the bottom absorber 32 extends substantially vertically below the top absorber 10.

The bodywork has a curved bumper skin 34 of conventional type extending in front of the two absorbers 10 and 32, and from one absorber to the other so as to cover the front faces thereof and hide them from view from in front of the vehicle. The skin 34 is fixed to each absorber in conventional manner, e.g. for the bottom absorber 32 by means of nuts and bolts 35 which also pass through the fairing plate 12.

The fairing 12 presents good stability in the event of an impact at 56 km/h. A fairing of this type, but without the front section member 18 and not associated with a bottom absorber 32, is described in patent application FR-2 757 124. In the event of impact against a pedestrian, the section member 18 serves as a low contact point with the tibia 36 whose center of gravity is situated at the point 38. The tibia is connected to the leg 40 by the knee 42. The fairing is preferably placed low enough to ensure that impact takes place as a general rule below the center of gravity 38 of the tibia so as to facilitate initiation of leg rotation.

To satisfy the other conventional constraints on an under-engine fairing, the fairing 12 can be made of glass fiber reinforced thermoplastic material. These constraints are:

resistance to engine compartment fluids;

resistance to small impacts;

resistance to impact from chippings;

resistance to flame propagation; and sound absorption and insulation.

The fairing 12 could be made in particular out of a reinforced thermoplastic material suitable for stamping (comprising polypropylene and glass fibers), out of a thermoplastic material including interleaved fiberglass mats, out of injected polypropylene, or out of glass fiber reinforced polyurethane. Alternatively, the fairing could be made out of SANDWIFORM, which comprises a sandwich of two composite skins of thermoplastic material in a honeycomb configuration as described in patent EP-0 649 736-B1.

Sound insulation can be obtained in conventional manner by adding an additional layer of material, e.g. felt.

The side rails 16 and the section member 18, which are of open section in this case, could be closed. The plate 14 and at least one of the side rails 16 and the section member 18 could also be molded separately and subsequently assembled together by rivets, adhesive, heat sealing, etc. The side rails 16 and the section member 18 need not touch.

It can be seen in FIG. 1 that the top absorber 10 extends further forward than the bottom absorber 32. The same applies to the top and bottom portions 44 and 46 respectively of the bumper skin covering them. The high contact point 44 of the bumper is thus further forward than the low contact point 46. Such a solution is presently preferred in terms of car styling. (Nevertheless, it should also be observed that the portions 48 and 50 of the bumper which are contiguous, with the bottom portion 46 are set further back than the bottom portion 46 which is therefore locally the furthest forward portion and thus forms the low contact point.) To compensate this, it is preferable to use a low absorber that is more rigid than the high absorber in response to a frontal impact from the front of the vehicle. For example, both absorbers could be made of expanded polypropylene foam, with the top absorber 10 having a density of 40 grams per liter (g/l) to 60 g/l and the bottom absorber 32 having a density of 80 g/l to 100 g/l. Thus, although the high point 44 is further forward, it compresses more than the low point 46 in the event of a pedestrian impact. Under such circumstances, during the impact, the effective thrust of the bumper against the leg tends to take place at the low point 46. The stiffness actually given to the beam 4 and to the section member 18 can also play a role in this respect and can thus be selected accordingly.

Other materials can be used for the absorbers 10 and 32, e.g. polyurethane foam for both absorbers. For the bottom absorber, it is possible to use a cellular honeycomb structure of polypropylene or of polycarbonate.

The section member 18 could be positioned further forwards and the bottom absorber 32 could be omitted such that the section member 18 extends entirely in register with the skin 34.

Alternatively, the bottom contact point 46 of the bumper could be disposed vertically below the top contact point 44, or even in front of it, so that the bottom point is the point that is further forward, with the bottom absorber 32 and the section member 18 being advanced accordingly.

In the invention, since the bottom bearing point 46 is not connected to the side rails 2 of the main structure, force is not transferred thereto in the event of an impact against the low point 46 of the bumper, and as a result they are not deformed.

What is claimed is:

1. A combination of a vehicle front bumper skin (34) and a bottom closure piece for the engine compartment and mounted behind the skin relative to the main travel direction of the vehicle, the closure piece including a front transverse section member (18) extending entirely in register with the skin.

2. A combination according to claim 1 characterized in that combination includes a shock absorber (32) extending behind the skin (34) and in front of the section member (18).

3. A combination according to claims 2, characterized in that the absorber (32) comprises a cellular material.

4. A combination according to claim 2, characterized in that the absorber (32) is a bottom absorber, and the combination further includes a top beam (4) and a top shock absorber (10) mounted behind the skin (34) and in front of the beam, the bottom absorber (32) being stiffer than the top absorber (10) against a frontal impact from the front of the vehicle.

5. A combination according to claim 1, in that the closure piece (12) includes two side rails (16) extending in the main travel direction of the vehicle.

6. A combination according to claim 5, characterized in that the section member (18) and the side rails (16) form a U-shape when seen from above.

7. A combination according to claim 4 characterized in that the skin (34) is contoured such that a portion (46) of the skin forms a low contact point that is more forward than other contiguous portions (48 and 50) of the skin.

8. A combination according to claim 1, in that the closure piece comprises a plate (14) and presenting a general plane of symmetry, the piece being characterized in that it includes the front section member (18) extending transversely to the plane of symmetry.

9. A combination according to claim 8, characterized in that the closure piece comprises a layer of thermoplastic material.

10. A combination according to claim 8, characterized in that the closure piece comprises a sandwich of two layers of thermoplastic material on either side of a honeycomb layer of thermoplastic material.

11. A combination according to claim 8, characterized in that the closure piece comprises a layer of thermoplastic material including glass fibers.

12. A combination according to claim 8, characterized in that the section member (18) is integral with the plate (14).

13. A combination according to claim 8, characterized in that the section member is a downwardly-open channel section member.

14. A combination according to claim 5, characterized in that the side rails (16) are integral with the plate (14).

15. A combination according to claim 5, characterized in that the side rails (16) are downwardly-open channel section members extending there along.

16. A combination according to claim 5, characterized in that the side rails (16) have respective rear ends closed by walls (24).

17. A combination according to claim 8, characterized in that the closure piece has a ramp (22) at its rear edge to support the plate (14).

* * * * *

UNITED STATES PATENT AND TRADEMARK OFFICE
CERTIFICATE OF CORRECTION

PATENT NO.    : 6,435,577 B1                                                   Page 1 of 1
DATED         : August 20, 2002
INVENTOR(S)   : Thierry Renault It is certified that error appears in the above-identified patent and that said Letters Patent is hereby corrected as shown below:

Column 5,
Line 1, after "claim" delete "4" and insert -- 1 --.
Line 2, after "closure piece" insert -- 12 --.

Signed and Sealed this

Tenth Day of June, 2003

JAMES E. ROGAN
*Director of the United States Patent and Trademark Office*